United States Patent [19]
Korr et al.

[11] 3,842,724
[45] Oct. 22, 1974

[54] APPARATUS AND PACKAGE FOR USE IN HEATING OR COOKING OF FOOD BY ELECTRICAL CONDUCTION THROUGH THE FOOD

[76] Inventors: Abraham L. Korr, 8712 Hickory Dr., Philadelphia, Pa. 19136; James F. Mahoney, 55 Lakeside Dr. N., Kinnelon, N.J. 07405; Bernard T. Svihel, 7812 Cobden Rd., Laverock, Pa. 19118

[22] Filed: Sept. 27, 1972

[21] Appl. No.: 292,609

[52] U.S. Cl. ................... 99/358, 99/332, 219/518
[51] Int. Cl. ........ A23b 1/06, A47j 27/62, F24c 7/08
[58] Field of Search ............ 99/358, 327, 332, 335, 99/349, 427, 451; 219/517, 518

[56] References Cited
UNITED STATES PATENTS

| | | | |
|---|---|---|---|
| 2,155,425 | 4/1939 | LaMere | 219/518 X |
| 2,200,406 | 5/1940 | Watson | 99/358 |
| 2,516,503 | 7/1950 | Bock | 219/518 X |
| 3,218,957 | 11/1965 | Fernell | 99/357 X |
| 3,257,934 | 6/1966 | Korr | 99/358 |
| 3,330,203 | 7/1967 | Korr | 99/358 |
| 3,372,286 | 3/1968 | Rotunda | 317/139 X |
| 3,490,717 | 1/1970 | Rejler | 99/331 UX |
| 3,500,742 | 3/1970 | Tanguy et al. | 99/326 |
| 3,521,130 | 7/1970 | Davis et al. | 317/139 |
| 3,543,673 | 12/1970 | McDevitt | 99/358 |

OTHER PUBLICATIONS
General Electric SCR Manual, Pg. 140, Section 8.8.1, Phase–Controlled D.C. Supplies.

*Primary Examiner*—Harvey C. Hornsby
*Assistant Examiner*—Arthur O. Henderson
*Attorney, Agent, or Firm*—Howson and Howson

[57] ABSTRACT

Prepackaged food to be heated or cooked is provided in a container having electrodes for passing current through the food, and also having indicia thereon related to the electrical conducting properties of the food and providing information in machine-readable form as to how the current to the food should be controlled for best results. The food package is placed into apparatus which connects a current source to the electrodes to accomplish the desired heating or cooking by the passage of current through the food. The apparatus includes means for sensing the indicia and for producing current-control signals which cause an appropriate initial current to be passed through the food, and which reduce the current by substantial decrements whenever certain potentially harmful increases in current through the food occur during the heating or cooking process. The power absorbed by the food is preferably also monitored, and appropriate safety and indicator devices provided. The desired heating or cooking is accomplished very quickly, yet without burning or rendering the food unappetizing.

7 Claims, 9 Drawing Figures

PATENTED OCT 22 1974 3,842,724
SHEET 1 OF 3

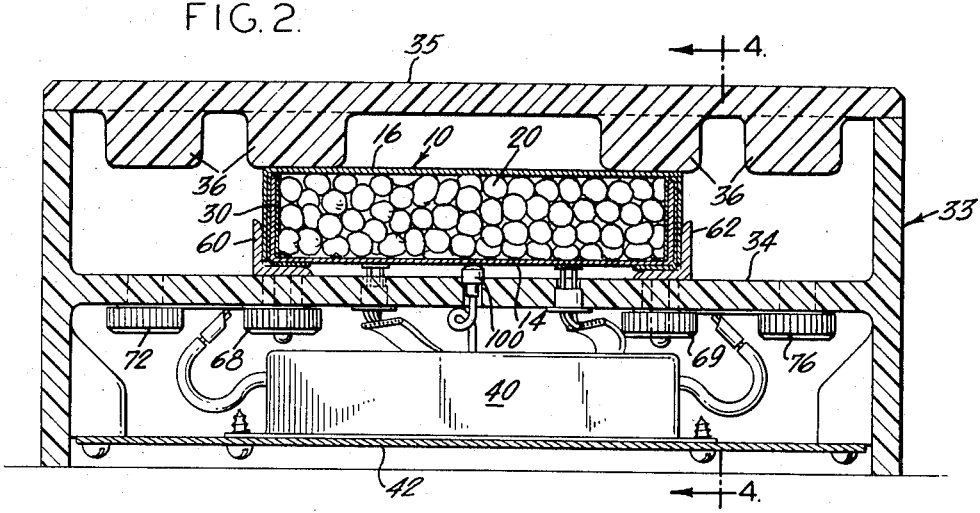
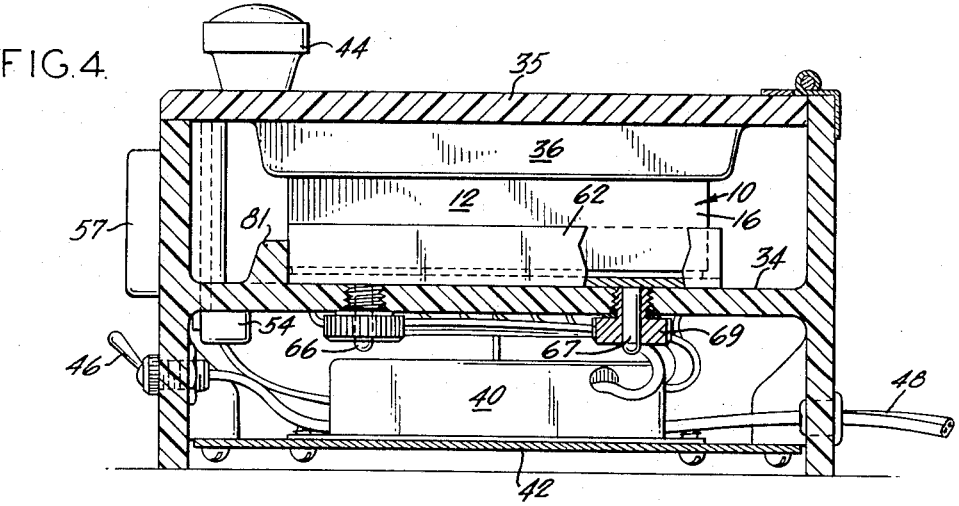
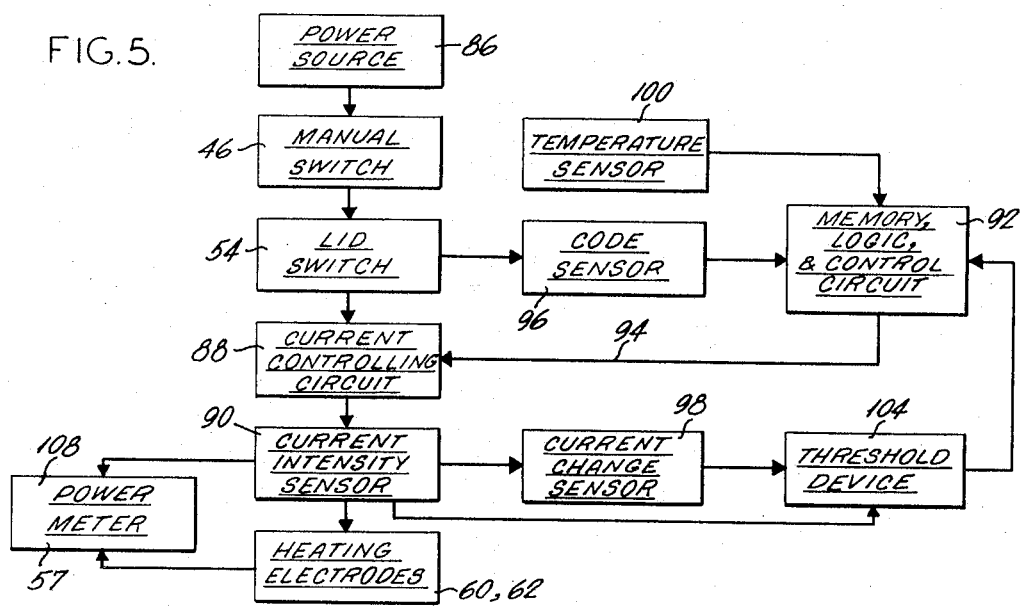

APPARATUS AND PACKAGE FOR USE IN HEATING OR COOKING OF FOOD BY ELECTRICAL CONDUCTION THROUGH THE FOOD

BACKGROUND OF THE INVENTION

This invention relates to improved apparatus for the heating or cooking of packaged food by the passage of current through the food, and to a food package suitable for use therein. More particularly, it relates to apparatus and food package which enable thorough heating or cooking of the food by electrical conduction to be accomplished in an optimum manner automatically, without requiring critical operator adjustments for different foods to be heated or cooked, and without burning or rendering the food unappetizing.

It is known that heating or cooking of foods may be accomplished by passing electrical currents through them. Such a method is particularly attractive because of its capability of accomplishing the desired heating or cooking in a very short period of time. For example, prepackaged convenience foods to be defrosted, reheated and/or cooked are of maximum convenience when these steps can be accomplished very quickly, especially when they are to be dispensed at a short-order restaurant or from a vending machine.

U.S. Pat. No. 3,330,203 of A. L. Korr, entitled "Food Heating Oven" and issued July 11, 1967 describes an arrangement in which food is packaged in a container having electrodes extending from inside the package to the exterior, and between which the packaged food is located. A heating or cooking apparatus is also provided which receives the package so that the package electrodes rest upon appropriate contacts through which electrical current is supplied to the food. The current is continued for a timed interval, and then terminated.

Said patent also discloses one approach to handling the heating or cooking of packages of food of different quantities or types. More particularly the patent discloses an arrangement by which the weight of the food package is sensed and used to vary appropriately the amount of current passed through the food, for example, by varying the time of heating or cooking. While useful for some purposes, this approach has been found to be not entirely versatile, particularly where a variety of types of foods are to be heated or cooked entirely automatically and in an optimum manner. For example, it has been found that even for food packages of the same weight, differences in the electrical characteristics of the food and in the extent of heating and cooking to be performed require different programs of heating and cooking for best results.

The advantage of an automatic electrical heating or cooking apparatus lies not only in the fact that a skilled operator is not required, but also in the fact that the operator may be entirely eliminated. For example, a variety of prepackaged foods may be stored in a vending machine, whereby the buyer merely indicates the food desired and the machine automatically selects the desired food package, heats or cooks it properly, and makes it available to the buyer promptly.

Accordingly, it is an object of the invention to provide a method, apparatus and food package which enable improved heating or cooking of packaged foods automatically, by the conduction of electrical current through the food.

Another object is to provide an apparatus and package which enable automatic electrically-conductive heating or cooking of food in a manner which produces optimum results for a variety of food package sizes, shapes and contents.

It is also an object to provide an apparatus and package which accomplish such automatic heating or cooking while avoiding certain deleterious effects which tend to arise in the course of the cooking or heating and which can cause burning of the food or render it unappetizing.

It is also an object to provide an apparatus and food package which are simple, convenient, reliable, relatively inexpensive, safe and convenient to use, and conservative of electrical power, as well as being adapted for use with an automatic food vending machine.

A further object is to provide a food heating or cooking apparatus which records the cumulative total power consumed by the food packages during heating or cooking.

SUMMARY OF THE INVENTION

These and other objects of the invention are achieved by the provision of an apparatus and food package of the following general type. A package of food is provided which comprises a container containing the food, electrodes secured to the container for applying a voltage across the food, and machine-readable indicia on said container representing current-control information to be used in controlling the application of the electrical current to said food by way of said electrodes in the heating or cooking of food. Since the electrical properties of the food, and the extent and nature of the heating or cooking suitably to be performed on it, will differ in general between different packages of food due particularly to differences in the food contained in the packages, the indicia on the container provide the information necessary for automatic control of the heating or cooking process to produce best results for that particular food. In a preferred form, the indicia on the food container comprises a pattern of electrically conductive and nonconductive regions, preferably comprising a pattern of spaced-apart conductive areas on a nonconductive container.

In accordance with the food in its indicia-bearing container is connected, by means of said electrodes, to an electrical heating or cooking means for passing an electrical current through the packaged food, and the indicia are automatically read to produce current-control signals which in turn are used to control the flow of current through the food in accordance with the information contained in the indicia. Preferably the indicia contain information for setting the original level of heating current passed through the food, and preferably the current is decreased by a substantial discrete decrement each time potentially harmful increases in current tend to occur.

Apparatus in accordance with the invention comprises indicia-reading means for producing current-control signals in response to the machine-readable indicia on the container representing current-controlling information characteristic of the packaged food, and means for varying the current passed through the food during the heating or cooking in response to the control signals. Preferably the apparatus comprises means for setting the original heating or cooking current at a predetermined level characteristic of the food in the container, and also contains means for sensing the heating current passing through the packaged food and for automatically reducing the current by a substantial discrete decrement each time it tends to rise above a predetermined level at which undesired effects are likely to occur in the food. Preferably the apparatus also includes current-intensity sensing means and/or current-change sensing means, either or both of which may be used to provide indications of when the said increases in current are about to occur and to cause the current to be reduced before this occurs. In addition, the apparatus preferably comprises apparatus for sensing and indicating the cumulative total power applied to the food during each heating and cooking procedure.

BRIEF DESCRIPTION OF THE DRAWINGS

These and other objects and features of the invention will be more readily understood from a consideration of the following detailed description, taken in connection with the accompanying drawings, in which:

FIG. 2 is a vertical sectional view taken along lines 2—2 of FIG. 1;

FIG. 3 is an enlarged, fragmentary sectional view taken along lines 3—3 of FIG. 1a;

FIG. 4 is a vertical sectional view taken along lines 4—4 of FIG. 2;

FIG. 5 is a schematic block diagram of the major operational elements in the apparatus of FIG. 1;

DETAILED DESCRIPTION OF SPECIFIC EMBODIMENTS

Figure 1A:
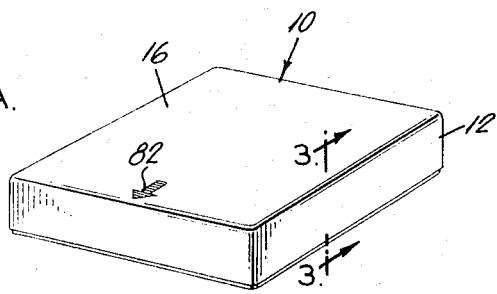
FIG. 1a is a top perspective view of the food package shown in FIG. 1.

Referring now to the embodiment of the invention illustrated in the drawings by way of example only, FIGS. 1–4 will first be described. In this example the food package 10 comprises a container 12 having a box-like bottom portion 14 with upstanding sides and a removable cover 16 which extends across the top of bottom-portion 14 and downwardly along the exterior of its upstanding sides, as shown for example in FIG. 3. The container contains the food 20 (see FIG. 2) to be heated or cooked, which may for example be a stew or frankfurter and beans, or any other food. On the lower side of the box bottom-portion 14 there are located indicia means, in this case comprising the four conductive circles 22, 23, 24 and 25. In this example the container is assumed to be of electrically non-conductive material, so that the conductive elements 22-25 produce a pattern of conductive and nonconductive regions on the lower face of the box bottom. The particular pattern in which these conductive regions occur provides a code representative of current-control information characteristic of the food in the container, which information is used to control the current later passed through the food during the cooking and heating process as described in detail hereinafter.

As described in the above-cited patent of A. L. Korr, an electrically-conductive electrode 28 such as an aluminum foil is provided along one edge of the box bottom, and another similar electrode 30 provided along the opposite edge, whereby electrical current may be passed through the food between the electrodes. In this example, each electrode has an external lower portion extending a short distance inwardly along one edge of the box bottom as at 32 to which external electrical contact can be made, and each electrode extends upward along one side of the box bottom, around the top edge of that side, downwardly along the interior side of the box edge, and thence inwardly for a short distance along the bottom of the box.

The heating or cooking apparatus comprises a cabinet 33 of insulating material having an integral insulating false bottom 34. A hinged lid 35 is provided for cabinet 33 to permit placement of the food package within the cabinet, and pressure bars such as 36 are provided on the interior side of the lid so that when the lid is closed and the package is in position within the cabinet, a downward pressure is exerted on the package.

Electronic circuitry for the heating and cooking apparatus are mounted within a chassis 40, which in turn is mounted on a bottom panel 42 secured to the cabinet beneath the false bottom 34. A knob 44 is provided to facilitate opening and closing of the lid 35.

A manually-operable power switch 46 is provided on the front of the cabinet 33 to enable turning on and off of the electrical power supplied to the apparatus by way of the power line 48, which may extend to and be plugged into any suitable standard power outlet of 220 volts AC, for example. On the front face of the cabinet there are also provided a "power on" pilot lamp 50 which becomes illuminated when the power switch is in its "on" position; a "heat on" pilot lamp 52 which becomes illuminated when the lid 35 is closed so as to actuate a lid switch 54 (FIG. 1); and a "ready" pilot light 56 which becomes illuminated when the heating or cooking is completed and the food package is therefore ready to be removed. An indicator 57 of the total accumulated electrical power absorbed by the food may also be mounted on the front of cabinet 33.

Located within the cabinet on the false bottom 34 are a pair of channel members 60 and 62 of conductive material which serve as the current-supplying electrodes (or channel members) for contacting the package electrodes 28 and 30. Each channel member has along its length a pair of downwardly-extending pins such as 66 and 67 each seated in a corresponding electrically-conductive bushing such as 68 and 69 which extends through the false bottom 34. Another pair of similar bushings 70 and 72 (FIG. 1) is positioned nearer one sidewall of cabinet 33, and a further pair of similar bushings 74 and 76 is positioned nearer the opposite sidewall of cabinet 33. The channel members 60 and 62 may therefore be inserted in the bushings as shown in the drawing, or lifted upwardly therefrom and inserted in the other pairs of bushings 70, 72 and 74, 76 to accommodate larger food packages between them. Wires extending from chassis 40 maintain the four bushings to the right of center of the cabinet at a given potential, and other wires from chassis 40 maintain the four bushings to the left of center of cabinet 33 at a different potential, so as to provide the desired voltage differences between the channel members when they are plugged into their corresponding bushings.

In accordance with the invention, means are provided for sensing the indicia such as 22–25, in the form of separate pairs of conductive probes such as the pairs 77, 78, 79 and 80 extending upwardly from the false bottom 34 and preferably spring-mounted so as to ensure reliable contact with the under-surface of the package when it is placed in the cabinet. The pairs of probes are so positioned that if there is a conductive area corresponding in position to a particular probe pair, then the ends of that probe pair will both contact that area and be short-circuited together by it, thereby providing a signal indicative of the presence of the conductive area; those probe pairs which contact other regions of the package which are not conductive will not be short-circuited together. Accordingly, the particular combination of probes shorted together corresponds to the pattern of conductive regions on the underside of the package. By applying a voltage difference between the probes in each pair, currents are produced in the separate probe circuits indicative of the pattern of indicia, and are used as described hereinafter to control the current passed through the food.

In this embodiment, the false bottom 34 is provided with a front ledge 81 so positioned with respect to the probes that when the package is placed in cabinet 33 between the channel members and with its front pressed against the ledge 81, the package will be in a predetermined reference position with respect to the probes, so that the indicia can be properly read. It will be understood that other or further arrangements for assuring accurate alignment of the package may be used if desired. In this embodiment also, the package is shown as having a reference marker in the form of an arrow 82 at the center of its top surface, and a reference marker 83 is provided on the top of the ledge 81, and when the package is introduced into the cabinet manually by an operator it will be positioned with the arrow 83 aligned with the marker 83. Instructions for the operator to so align the package will avoid its insertion in the cabinet in the improper orientation. In an automatic vending machine the package will of course be automatically delivered in the proper orientation.

Figure 1:
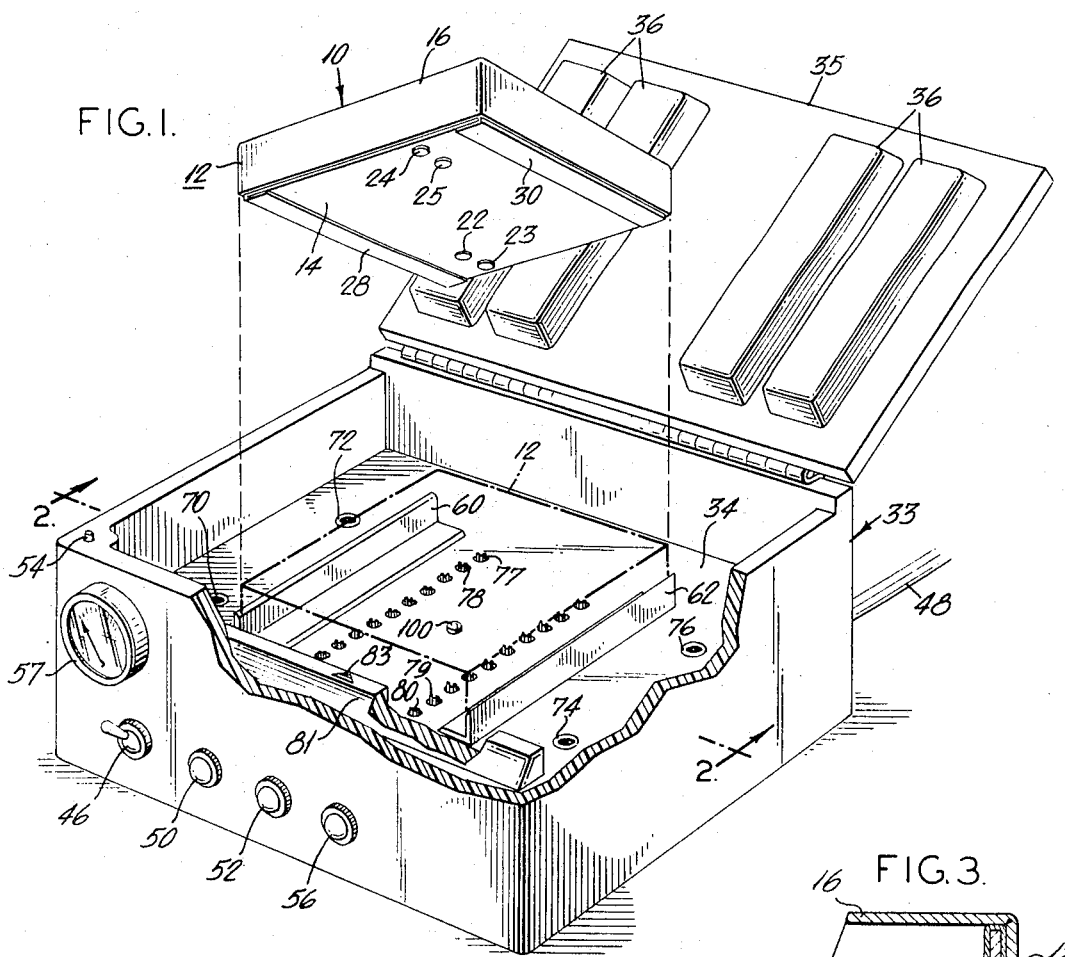
FIG. 1 is a perspective view of food heating or cooking apparatus embodying the invention, showing also the food package about to be placed within the apparatus for heating or cooking.
Figure 3:
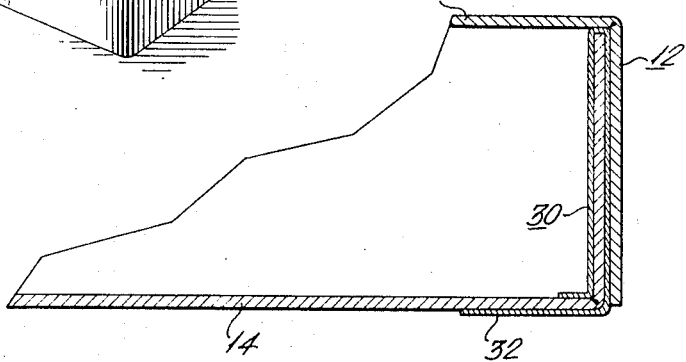

Referring to FIG. 5, the particular form of circuitry illustrated therein in block form is as follows. A power source 86, which may be a 220 volt AC wall outlet for example, supplies operating power through manual switch 46 and lid switch 54 to current-controlling circuit 88, current from which is passed through a current intensity sensor 90 to the heating electrodes 60, 62. The current-controlling circuit 88 is in turn controlled from the memory, logic and control circuit 92 so that a desired, predetermined suitable program of current is supplied to the heating electrode for effecting the desired heating or cooking of the particular food in the package. Memory, logic and control circuit 92 produces its control output on line 94 in response to input information supplied thereto from code sensor 96, from current intensity sensor 90, from current change sensor 98 and from temperature sensor 100. Temperature sensor 100 may be a thermostat device having its temperature sensing element positioned as shown in FIG. 1 to be in intimate thermal contact with the underside of the package when it has been placed in the cabinet 33.

Code sensor 96 receives its supply power from lid switch 46, and includes the above-described probe pairs for sensing the code on the food package and for producing electrical signals representative thereof for supply to the memory, logic and control circuit 92. Current intensity sensor 90 senses the current being supplied to the heating electrodes, and supplies its output to a threshold device 104 which in turn produces an output to the circuit 92 when the current intensity has reached a predetermined level; current change sensor 98 produces an output signal representative of the rate of increase of current intensity, supplies the signal to threshold device 104, and the latter device supplies an output signal to circuit 92 when the rate of change exceeds a predetermined threshold. In the present embodiment, that one of the current intensity sensor 90 and the current change sensor 98 which first produces an output signal rising above the threshold level will cause threshold device 104 to supply an input to circuit 92. In addition, it is noted that a power meter 108 is connected to the heating electrodes for the purpose of producing an indication of the cumulative total electrical power dissipated in the food.

With this general organization of the system in mind, the more detailed representation of the electrical elements of the system will now be described with reference particularly to FIG. 6, in which parts corresponding to those in the other figures are indicated by corresponding numerals.

The alternating current from source 86, such as a 220-volt wall outlet, has three output lines, one of which is preferably grounded and the other two of which are connected through line fuses 112 and 114, double-pole single-throw power switch 46 and double-pole single-throw lid switch 54 to the solid-state phase-controlled rectifier circuit 88 corresponding to the current controlling circuit 88 in FIG. 5. The "power on" pilot light 50 is connected across the two output lines from switch 46, and the "heat on" pilot light 52 is connected across the two output lines from switch 54.

One output lead of circuit 88 is connected directly to the heating electrode 60, and the other output line thereof is connected to the other heating electrode 62 by way of the current intensity sensor 90, which may include a small-valued series resistor the voltage across which is proportional to the supplied current.

The current intensity sensor 90 may be of conventional form, for example including means for rectifying the voltage across the sensing resistor therein to produce a DC voltage proportional to the heating current passing between the electrodes, and appropriate voltage divider circuitry for setting at a predetermined value the output voltage thereof supplied to the Schmitt trigger 104 constituting the threshold device in this example. Thus when the current between the electrodes reaches a predetermined level, the Schmitt trigger 104 will be operated.

The current change sensor 98 may also be of conventional form, and is supplied with the current-intensity representing voltage from sensor 90. Current change sensor 98 may, for example, comprise any of a variety of known differentiating devices for producing an output voltage proportional to the rate of change of an input voltage thereto. Preferably it also includes suitable voltage divider means which may be selected to determine what rate of change of current will operate the Schmitt trigger 104.

The purpose and detailed functions of the current intensity sensor 9o and of the current change sensor 98 will be described more fully hereinafter with particular reference to FIGS. 7 and 8. For the present, it is sufficient to point out that when either sensor actuates the Schmitt trigger 104, the Schmitt trigger passes current through solenoid coil 120 to move the armature thereof and to perform certain control functions to be described.

The alternating supply voltage from the lid switch 54 is applied through the step-down transformer 122 to the code sensor circuit 96. This circuit includes the pairs of probe contacts shown in FIG. 1, the break lines in the drawing indicating that there are, of course, many more such probe pairs than the four shown. By way of example probe pairs 77, 78 and 80 may be connected as shown in FIG. 6, while probe pair 124 in FIG. 6 represents one of the 16 probe pairs which do not correspond to a conductive area on the package of FIG. 1. Each probe pair is connected across the secondary of transformer 122 by way of a corresponding relay coil such as 77a, 78a, 80a and 124a in FIG. 6. The shorting of any pair of probes by a conductive area on the package will produce a current through its corresponding relay coil. For example, when the package is placed in the cabinet, the lid closed, and the power turned on a current will be produced through relay coils 77a, 78a and 80a shown in the drawings, as well as through another relay coil connected to probe pair 79 (not shown); on the other hand, no current will flow through relay coil 124a or any of the other coils associated with probe pairs not corresponding to conductive indicia on the food package. Passage of current to any of the relay coils causes the normally-open relay contacts associated therewith to become closed; thus the corresponding contacts 77b, 78b and 80b in memory, logic, and control circuit 92 would be among those closed in response to the indicia on the food package of FIG. 1, while relay contact 124b is an example of one which would not be closed by such indicia. The indicia on the food package are therefore read and converted into a corresponding pattern of closings of relay contacts in circuit 92.

The effects of the closing of a predetermined pattern of relay contacts in circuit 92 is to determine the initial average voltage, and hence the initial average current, supplied to the food from the solid-state phase-controlled rectifier circuit 88. The latter circuit may be a well known type in which the fraction of each cycle of the input voltage thereto which is passed on to the output is controllable by variation of certain phase conditions within the circuit. This phase condition in turn is controlled in the present example by variation of the net resistance provided in series with the capacitor 130, the series combination of this net resistance and of the capacitance of capacitor 130 being connected to the rectifier circuit 88. The lower the net resistance in series with the capacitor 130, the smaller the fraction of each cycle of input voltage which is passed on to the heating electrodes, and hence in general the less the current passed between the electrodes. The net resistance in series with capacitor 130 in turn is determined by the net resistance of the parallel combination of the parallel resistances provided by resistors in the various levels such as 123, 125, 126 and 128 of a multilevel stepping switch in circuit 92, and by the resistance of a small-valued fixed resistor 131 connected in series with capacitor 130 when thermostat 100 is closed.

The effect of the closing of particular combinations of the relay contacts switches is to select and place in series with the capacitor 130, a particular corresponding parallel combination of different levels of the stepping switch and the resistances connected thereto. In this example, each level contains a bank of three resistors and three corresponding contacts, such that when a given level is selected the total resistance of all three resistors will initially be placed in the circuit, but when the stepping switch is advanced one position only two of the resistors will be in the circuit; upon a further stepping of the switch, only one such resistor in any given level will be in circuit with capacitor 130. Thus each stepping of the switch causes an abrupt discrete decrease in resistance in series with capacitor 130, and a corresponding abrupt, discrete decrement in the voltage applied to the heating electrodes. When the food package is in the cabinet 33 with the power switch operated and the lid closed, a particular parallel combination of resistor banks in the various levels of the stepping switch will be selected in response to the indicia on the package, thereby to cause the solid-state phase-controlled rectifier circuit 88 to apply a corresponding predetermined average voltage between the heating electrodes 60 and 62, and hence a corresponding initial current through the food in the package.

For different foods, the food container will have different arrangements of its indicia which will cause closing of different sets of relay contacts and connect different banks of resistances in parallel to produce the appropriate initial voltage and current conditions for that food. Thereafter, during the heating or cooking cycle, when either the current intensity sensor 90 or the current change sensor 98 produces an output voltage in excess of the threshold of the Schmitt trigger 104, the armature of solenoid 120 will cause the switch in each level to advance one position, thus reducing the current through the food, and this will be repeated to reduce the current again by a discrete amount if the current or rate of current increase again reaches a predetermined level. When the thermostat 100 senses that the food has reached its desired temperature, the thermostat 100 closes and places a very low resistance 131 in shunt with the resistances of the stepping switch, thereby to decrease the average voltage and current applied to the food to a negligible value.

At this time, the same temperature-sensing elements which operate the thermostat switch 100 operate thermostat switch 100a. Thermostat switch 100a is normally open and is connected in series with the coil of a solenoid 140, this series combination being connected across the secondary of transformer 122. When the final desired temperature is reached, the thermostat switch 100a closes and passes current through the coil of solenoid 140, and the armature of solenoid 140 then acts on the stepping relay to reset it to its original condition shown in the drawing. The "ready" lamp 56 is connected across the coil of solenoid 140, and turned on when switch 100a is closed to indicate the heating or cooking is completed and that the food is ready to be removed from the cabinet 33.

Figure 7:
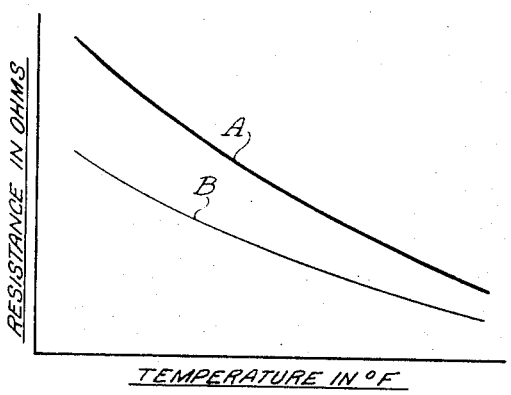
FIGS. 7 and 8 are graphical representations to which reference will be made in describing the operation of the invention.
Figure 8:
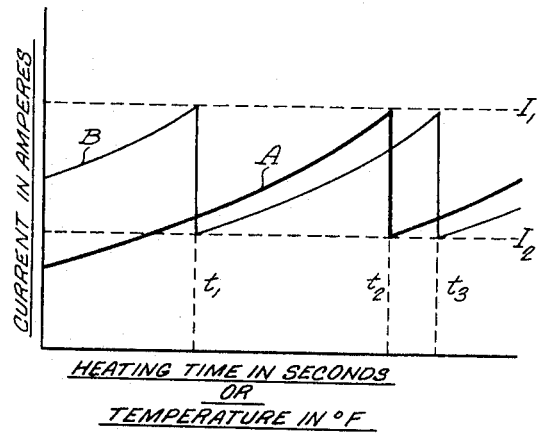

Some of the purposes and advantages of the system disclosed above will become clearer from a consideration of the graphs of FIGS. 7 and 8. In FIG. 7, ordinates represent resistance of the food between the heating electrodes in ohms, and abscissae represent temperature of the food in degrees Farenheit. Curve A of FIG. 7 shows the nature of the decrease in resistance with increasing temperature for one food, such as a package of beef stew for example, while curve B represents the same type of information for another food such as frankfurter and beans, for example. It is noted that the resistances at any temperature differ for the two foods and that the nature of the variation with temperature is similar but differs somewhat. Other materials may in general have quite different resistance-versus-temperature characteristics. If a fixed voltage is applied across the food, the drop in its resistance during heating shown by FIG. 7 will cause the current to increase. We have found that when the current increases beyond a certain level, portions of the food will burn or become unappetizing, quite abruptly. Observations indicate that, at a rather critical current density, excessive agitation of the food near the electrodes suddenly occurs, followed rapidly by burning or overcooking. It is believed that this is due to the sudden development of steam pockets within the food, through which arcing of the current occurs.

In FIG. 8, ordinates represent current in amperes through a particular size of food package, and abscissae represent heating time in seconds, or temperature in degrees Farenheit, the curves on the graph being illustrative and not necessarily exact in detail. Curve A of FIG. 8 represents the current variation with time during progressive heating of the food corresponding to curve A in FIG. 7; this current starts out at a relatively low level and increases until it reaches the level $I_1$. At this time $t_2$, the relay control stepping switch is operated by sensor 90 or sensor 98 so it is stepped by one position, with the result that the current through the food is dropped abruptly by a discrete decrement, to the lower value $I_2$, after which the heating continues. Should the current again rise to the level $I_1$, the stepping circuit will be operated to its next lower position, and the current again reduced to level $I_2$, from which it resumes its gradual increase. With three-position switches in the stepping circuit, it is assumed that only two such decreases need be made before the food has been completely heated and cooked.

Curve B in FIG. 8, corresponding to the food represented by curve B of FIG. 7, shows heating with a higher value of initial current, and the maximum current value $I_1$ is reached at an earlier time $t_1$, at which time the current is abruptly decreased by the stepping relay circuitry to the lower level $I_2$; the current in this case then increases again with increasing time and temperature, until at the time $t_3$ it again reaches the value $I_1$, and is automatically reduced again to the value $I_2$. By using a greater number of switching positions in the relay stepping switch, as many of these abrupt decreases in current may be provided as are necessary in any particular application.

The value $I_1$ is so chosen as to lie just below that value of current where the above-described harmful effects tend to occur abruptly when heating or cooking foods by electrical conduction through them. Thus in the embodiment of FIG. 6, the current intensity sensor 90 and the Schmitt trigger 104 may be selected and adjusted so that when the current value $I_1$ is sensed, the Schmitt trigger will operate and step the relay stepping switch by one position. It has also been found that the rate of change of this current may also be used as an indicator of when the harmfully high current is about to occur. More particularly, referring to FIG. 8, it will be seen that the greatest rate of rise of the current is just before the level $I_1$ is reached, and the current change sensor 98 and the Schmitt trigger 104 may also be selected and adjusted so that when such rate of increase occurs, the Schmitt trigger will be operated. In the arrangement of FIG. 6, both types of sensors are employed effectively in parallel, and the first one to indicate the imminence of a dangerously-high current operates the Schmitt trigger. It will be understood that in some cases either one of the sensors alone may be utilized.

It will also be understood that a variety of forms of food package differing from those shown in the figures may be utilized in different applications. Thus quite different types of containers may be utilized, and the indicia elements may also be quite different. For example, nonconductive regions on a generally-conductive background may be used, instead of the converse arrangement which is illustrated. Entirely other types of coding and reading may also be utilized; for example optically-different indicia may be sensed by optical-scanning apparatus, magnetic elements may be sensed by magnetic sensors, or physical configurations on the container may be sensed by physical sensors.

It will also be appreciated that the memory, logic, and control circuit 92, in effect, incorporates a memory bank in the form of the arrangement and values of the various banks of resistors connected to the various levels of the switches, different combinations of which are effectively called out by coded information on the food package. Accordingly, more conventional computer-type apparatus may be utilized for this purpose, with memory banks containing either simpler or much more complex programs, the appropriate program being called up by the control signals generated by the code sensor and utilized to program the current during the heating or cooking cycle in any optimum manner.

Similarly, the nature of the device effecting current control in response to the control circuitry may be quite different from that specifically described, as may be the details of the heating apparatus.

Figure 6:
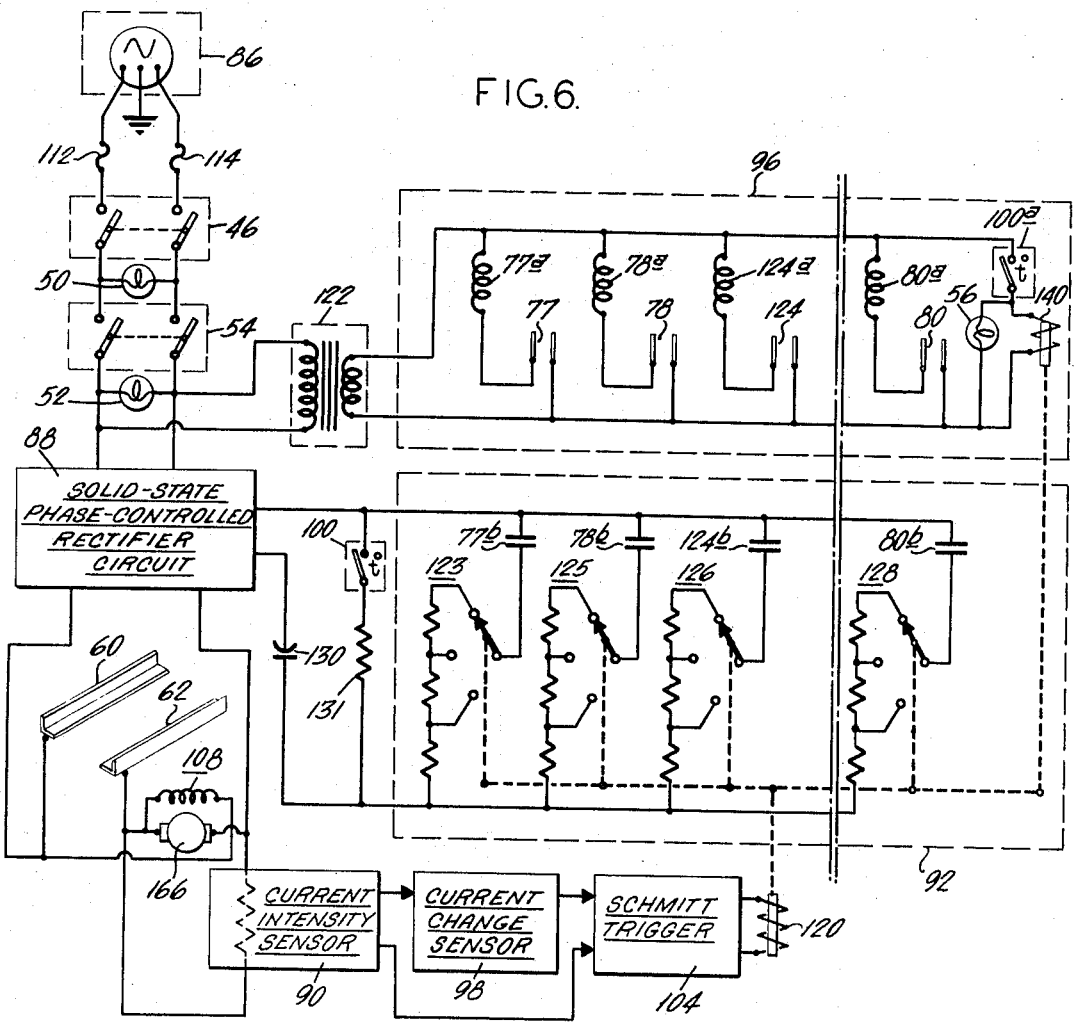
FIG. 6 is an electrical schematic view, partly in block form, of electronic circuitry suitable for use in the heating and cooking apparatus of FIG. 1.

FIG. 6 also shows one preferred manner of indicating the total accumulated power placed into the food. In this embodiment, the armature circuit 166 of a motor is connected across the current-sensing resistor in current intensity sensor 90, and the field circuit of the motor is connected between the heating electrodes 60 and 62. The output torque of the motor is therefore proportional to the product of the voltage between the heating electrodes and the current through the food. The motor output shaft may be geared to any conventional revolution counter, thereby to provide at 57 on the front of cabinet 33, an indication of total accumulated electrical power dissipated in the food.

While the invention has been described with particular reference to specific embodiments thereof in the interest of complete definiteness, it will be understood that it may be embodied in a variety of forms diverse from those specifically described, without departing from the spirit and scope of the invention as defined by the appended claims.

What is claimed is:

1. Apparatus for the heating or cooking of food packaged in a container, comprising:
 indicia reading means for producing current-control signals in response to machine-readable indicia on said container representing current-control information characteristic of said packaged food;

means for applying a voltage across said food in said container to pass a current through said food to heat or cook said food; and means supplied with said current-control signals for automatically varying said current while said heating or cooking is taking place, through values of current determined at least in part by said current-control signals.

2. Apparatus in accordance with claim 1, in which said means for varying said current comprises means for sensing the current through said packaged food and means for automatically reducing said current by a substantial decrement when said current reaches a predetermined level.

3. Apparatus in accordance with claim 1, in which said means for varying said current comprises a relay-controlled multilevel stepping switch responsive to said current-control signals to select different levels of said switch.

4. Apparatus in accordance with claim 1, in which said means for varying said current comprises means for sensing the rate of increase of said current through said food and means for decreasing said current by a substantial discrete decrement when said rate exceeds a predetermined value.

5. Apparatus in accordance with claim 1, comprising means responsive to the current through and the voltage across said food during said heating or cooking, to provide an indication of the total accumulated power absorbed by said food.

6. Apparatus in accordance with claim 1, comprising means for sensing changes in said current through said food occurring during said heating or said cooking and for further controlling said current in response to said changes.

7. Apparatus in accordance with claim 6, in which said sensing means comprises means for sensing when said current rises above a predetermined level, means for sensing when the time rate of increase of said current exceeds a predetermined value, and means for decreasing said current by a substantial decrement when either said current rises to said predetermined level or said rate of current increase rises to said predetermined value.

* * * * *